July 19, 1949.  S. ROSEN  2,476,564
RECLOSABLE BREAD PACKAGE HAVING TEAR
STRIP AND REINFORCING MEMBER
Filed July 5, 1946  2 Sheets-Sheet 1
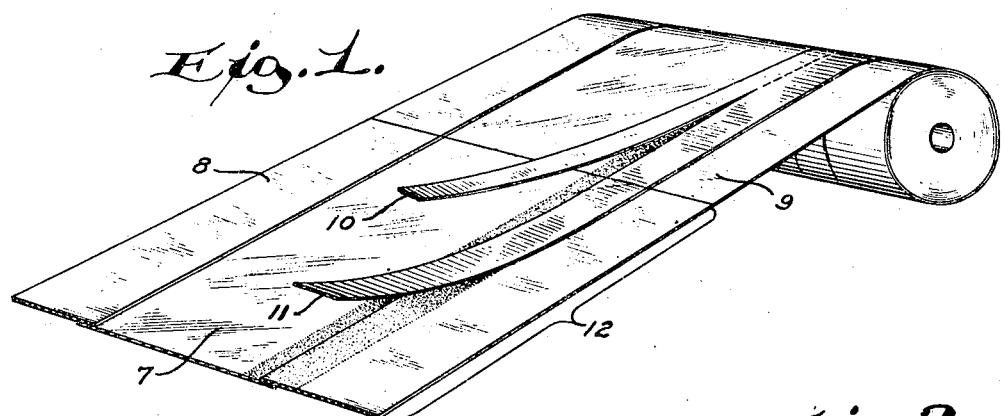
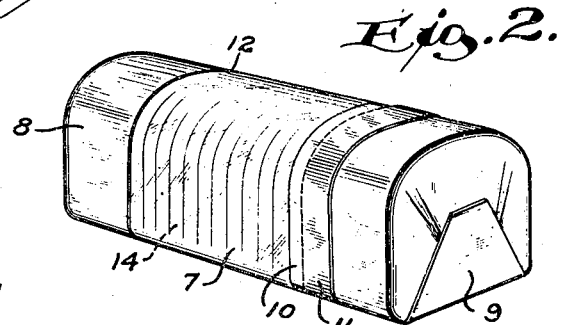
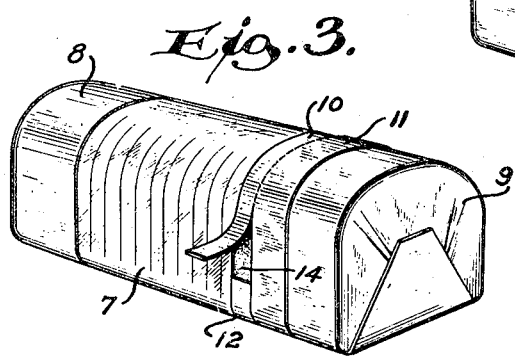
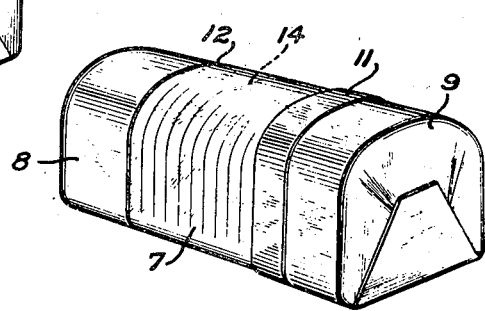
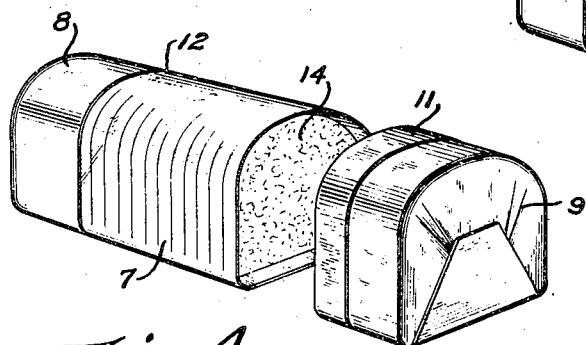
INVENTOR.
Shy Rosen
BY
Lieber & Lieber
ATTORNEYS.

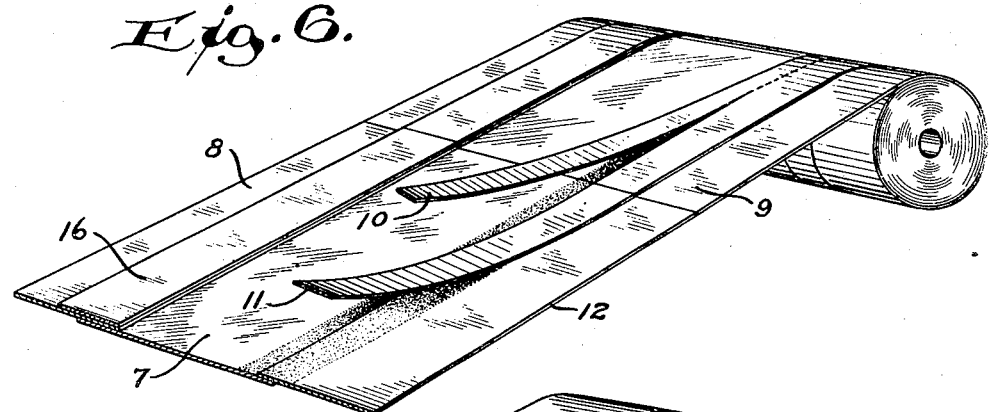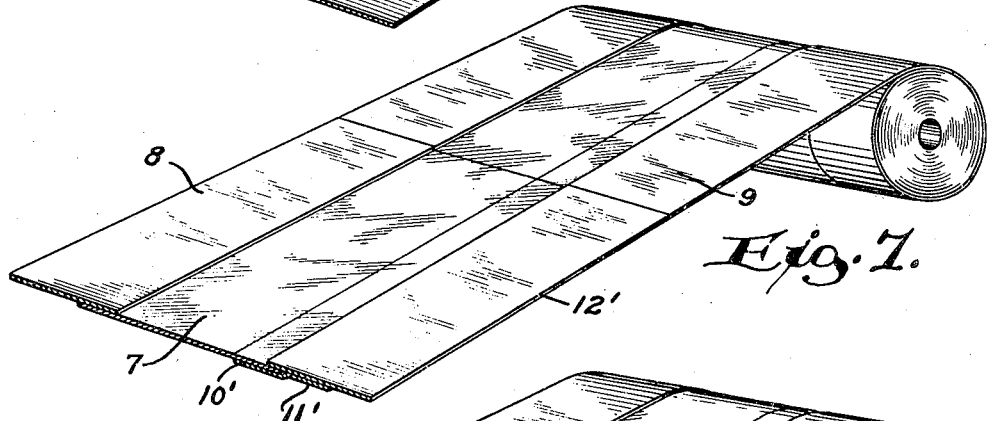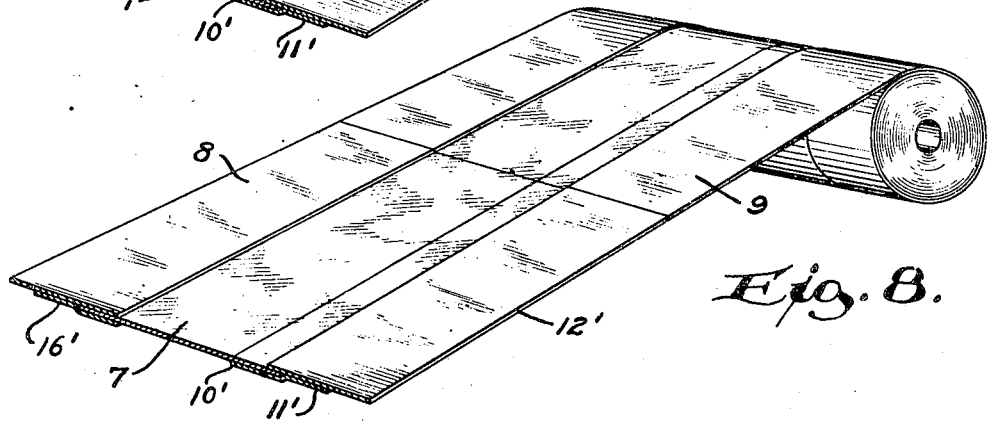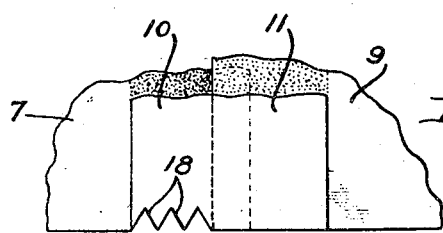

Patented July 19, 1949

2,476,564

UNITED STATES PATENT OFFICE 2,476,564

RECLOSABLE BREAD PACKAGE HAVING TEAR STRIP AND REINFORCING MEMBER

Shy Rosen, New York, N. Y., assignor to Milprint, Inc., Milwaukee, Wis., a corporation of Delaware Application July 5, 1946, Serial No. 681,501

2 Claims. (Cl. 99—173)

1

This invention relates in general to improvements in commodity wrappers, and relates more specifically to improvements in the construction and use of protective commodity wrappers for prism shaped articles such as bread loaves or the like.

The primary object of my present invention is to provide a new and useful wrapper which facilitates the handling, preservation, and merchandising of commodities such as bread loaves or the like.

Many different types of wrappers for bread loaves and similar articles which are adapted to be dispensed piece meal as in slices, have heretofore been proposed; and in some of these prior wrappers provision has been made whereby the packages could be re-closed after each removal of portions of the confined product. While a few of these prior re-closable wrapper assemblages were fairly satisfactory, all of them were either too complicated and difficult to manipulate, too bulky and rigid for utilization as bread wrappers, too costly for use in connection with low and moderate priced commodities, or too cumbersome to assemble and to apply to the articles. The prior wrappers of the re-closing type have not therefore become highly popular with the trade for want of a wrapper which eliminates these major objections.

It is therefore a more specific object of the present invention to provide an improved wrapper for piece meal dispensable commodities, which is simple, durable and inexpensive, and which may be conveniently and effectively reclosed after each removal of portions or batches of the confined product.

Another specific object of the invention is to provide an improved wrapper for bread loaves or the like, which may be formed of highly flexible and efficient wrapping sheet material, and wherein a removable section of the wrapper is effectively maintained in the form of a reenforced closure cap for the tubular residual commodity confining section whenever the package is opened.

A further specific object of my invention is to provide an improved wrapper especially adapted for the confinement of sliced bread loaves or the like, and which is provided with a simple closure capable of resealing and shortening the pack after each removal of one or more slices.

Still another specific object of this invention is to provide an improved bread wrapper of the type having a medial transparent loaf embracing section and cap-like opaque end sections, one of which sections is readily removable for the

2 withdrawal of bread, but is also conveniently replaceable to subsequently confine and protect the unused portion of the loaf.

These and other specific objects and advantages of the present invention will be apparent from the following detailed description.

A clear conception of the several features constituting my present improvement, and of the mode of manufacturing, applying and utilizing wrappers embodying the invention, may be had by referring to the drawing accompanying and forming a part of this specification in which like reference characters designate the same or similar parts in the various views.

Fig. 1 is a diagrammatic perspective view of a typical roll and ribbon of wrapping stock embodying my invention, showing several of the strips of stock partially removed so as to reveal normally concealed joints between adjacent sections;

Fig. 2 is a perspective view of a loaf of sliced bread initially packed in a wrapper cut from the stock ribbon of Fig. 1;

Fig. 3 is a similar perspective view of the same package with the opening tear strip partially removed;

Fig. 4 is a similar perspective view of the package with the tear strip entirely removed;

Fig. 5 is a similar perspective view showing the package re-closed after removal of some bread;

Fig. 6 is a perspective view similar to Fig. 1 but showing a modified type of wrapping stock;

Fig. 7 is another similar perspective view of a further modified type of improved wrapping stock;

Fig. 8 is still another modification; and

Fig. 9 is an enlarged fragment showing the formation of the end of the tear strip.

Although the invention has been shown as being advantageously applicable to sliced bread wrappers having transparent loaf embracing medial sections, it is not my desire or intention to unnecessarily limit the scope or utility of the improvement by virtue of such embodiment.

Referring to the drawings, the improved wrappers embodying my present improvement may be manufactured in various ways but are preferably formed by adhesively or otherwise uniting elongated strips of wrapper stock to produce rolls of composite ribbon such as illustrated diagrammatically in Figs. 1, 6, 7 and 8 and from which successive complete wrappers of any desired length may be severed in rapid succession. As specifically shown in Fig. 1, the wrapper stock ribbon is formed of a medial strip 7 of thin and highly flexible and readily tearable but transparent sheet material such as regenerated cellulose or the like, which is adhesively attached along its opposite edges to side strips 8, 9 respectively formed of somewhat thicker and less flexible opaque sheet material such as wax paper. The edge of the side strip 9 directly adjoining the transparent strip 7 is provided with a narrow tear strip 10 adhesively secured to the upper or outer surface of the strip 7 and the accessible end of which may be serrated as shown at 18 in Fig. 9 and which when peeled off of its carrying strip 9, will tear the thin strip 7 along a straight path and will separate the strip 9 from the main body of the strip 7. A relatively stiff but still flexible outer reenforcing strip 11 formed integrally with the tear strip 10, is preferably firmly attached to the side strip 9 directly adjacent to the tear strip 10 and is separated from the latter by a weakened line or row of perforations shown in dotted lines in Figs. 1, 2, 3, 6 and 9. The successive wrappers 12 may be severed from the composite wrapper ribbon in any desired manner, preparatory to packing the commodity, and the various modes which may be utilized to unite the several strips 7, 8, 9, 10, 11 are well known to those skilled in the art of composite wrapper production.

The completed composite wrappers 12 may be suitably printed and decorated and applied to sliced or unsliced bread loaves 14 as depicted in Fig. 2, so that the medial transparent strip 7 embraces the mid-portion of each loaf 14 while the opposite end portions 8, 9 are folded and sealed to thoroughly conceal the opposite loaf ends. With the composite wrapper 12 thus applied, the tear strip 10 and the reenforcing strip 11 will also snugly embrace the load 14, and the entire loaf will be snugly confined within a flexible but durable tightly sealed enclosure, and will thus be maintained in moist and fresh condition free from contact with the hands of subsequent handlers prior to breakage of the package.

When it becomes desirable to open or break one of the packages, it is only necessary to grasp one free end of the tear strip 10 and to peel the strip off as illustrated in Fig. 3. Removal of the tear strip 10 will promptly separate the end cap section 9 with its reenforcing strip 11 from the remainder of the wrapper sheet 12 along a straight narrow path encircling the loaf 14 near one end thereof by tearing off an edge portion of the intermediate strip 7 with the tear strip, and will permit slices of bread to be readily removed from the medial portion of the load without necessarily handling either of the end crusts, as clearly shown in Fig. 4. It is to be noted that while this separation of the wrapper 12 into two sections, may cause the free edge of the central transparent strip 7 to collapse slightly, the free edge of the cap section 9 will maintain its shape due to the stiffening action of the reenforcing band or strip 11 attached thereto.

After the desired amount of bread 14 has been removed, and if any unused bread remains, this residual commodity may again be confined and sealed within the wrapper sections 8, 7, by merely slipping the cup shaped and reenforced cap section 9 over the open end of the tubular transparent section 7, as depicted in Fig. 5. The bread 14 remaining within the sections 7, 8 will hold these sections in shape during such re-closing; and if the mid-section 7 extends beyond the remaining commodity prior to re-closing, it may be folded against the flat end of the loaf 14 before re-closing is effected. The residual bread may thus be effectively re-confined and protected after removal of a portion of the package contents, and these operations may be repeated until the commodity has been entirely dispensed. During such opening and re-closing of the package, the relatively stiff reenforcing band 11 will effectively maintain the closure cap in proper shape so as to facilitate re-closing and to provide a seal, and the re-sealed package will always present a neat appearance.

Referring to Fig. 6, the modified stock ribbon shown therein is substantially like that of Fig. 1, except that a second outer reenforcing strip 16 has been adhesively or otherwise attached to the side strip 8 adjacent to the longitudinal edge of the central strip 7 remote from the tear and reenforcing strips 10, 11. This additional reenforcing strip 16 besides materially strengthening the wrapper, enhances its opacity, and facilitates level winding of the stock rolls. As illustrated in Fig. 7, the stock ribbon has been modified to the extent of applying the tear strip 10' and a reenforcing strip 11' on the inside of the successive wrappers 12', instead of on the outside thereof as in Fig. 1; and as depicted in Fig. 8, the stock ribbon from which the successive individual wrappers are severed, has been additionally provided with an inner reenforcing strip 16' similar to the outer strip 16 of Fig. 6, in order to facilitate leveling of the rolls. The wrappers produced with all of these modifications may be applied and utilized in the same manner as hereinabove described in connection with Figs. 1 to 5 inclusive, and each of the successive wrappers 12, 12' may be provided with the end serrations 18 such as shown in Fig. 9 in order to facilitate gripping of the tear strips 16, 16'. It is also to be specifically understood that the reenforcing strips may either be initially applied to the stock ribbons and dispensed in roll formation as described, or they may be applied to the wrapper stock or to the wrappers within the final loaf wrapping machines, and I do not wish to be restricted as to the precise mode of application of the reenforcing and tear strips. If so desired, one reenforcing strip may also be disposed within and another may be located outside of the wrapper, in an obvious manner.

From the foregoing detailed description it will be apparent that my present invention provides a simple and durable protective wrapper for loaf-like commodity such as bread, which may be conveniently and effectively re-closed after portions of the commodity have been successively removed from the package. The improved wrappers may obviously be manufactured at low cost from inexpensive flexible but durable materials adapted to be applied to loaves of various shapes and sizes so as to snugly confine the bread or other commodity, and the wrappers may be provided with transparent or window sections 7 and are especially advantageously applicable to sliced bread loaves 14. The wrappers 12 may be constructed in various ways and of different materials depending upon their intended use, and when properly applied, will facilitate sanitary handling of the commodity and preservation thereof both during merchandising and subsequent consumption. With the aid of the improved wrapper, the bread slices will always be maintained in neat and compact condition and in contact with each other so as to exclude entry of air and undesirable evaporation of moisture, thus preserving and maintaining the commodity in fresh and wholesome condition until the last slices have been removed. While the reenforcing and tear strips 11, 10 are preferably applied to the original wrapper stock, these strips may also be applied to the packages after the commodity has been enclosed and sealed therein; and although the reenforcing strips 11 need not necessarily be formed as separate elements, and may be produced by folding back integral edge portions of the end strips 9, these strips 11 should ordinarily be made of relatively stiff stock so as to most effectively perform their reenforcing functions.

It should be understood that it is not desired to limit this invention to the exact details of construction or to the precise mode of application of the wrappers, herein shown and described, for various modifications within the scope of the appended claims may occur to persons skilled in the art.

I claim:

1. A flexible wrapper for sliced bread loaves or the like, comprising, a composite flexible sheet snugly embracing and enclosing a bread loaf and being composed of several edge to edge overlapping sheets one of which consists of stiffer flexible material than the adjoining sheet and the adjacent overlapped edges of which surround the loaf and are adhesively secured together, a reinforcing strip of flexible sheet material having a line of perforations extending therealong between its opposite side edges and overlapping and being adhesively secured to said overlapped marginal portions of both of said adjoining sheets to further stiffen said portion of said stiffer sheet, said reinforcing strip having a tear strip on one side of said perforation line and consisting only of that portion of the reinforcing strip which overlaps said more flexible sheet and having an end thereof accessible from the exterior of the wrapper to facilitate removal of the tear strip and a portion of said adjoining more flexible sheet outwardly away from the adjacent end of the stiffer sheet and from said reinforcing strip for gaining access to the loaf by separating the wrapper into two complementary flexible cup-shaped sections.

2. A flexible wrapper for sliced bread loaves or the like, comprising, a composite flexible sheet snugly embracing and enclosing a bread loaf and being composed of several edge to edge overlapping sheets one of which consists of stiffer flexible material than the adjoining sheet and the adjacent overlapped edges of which surround the loaf and are secured together, a reinforcing strip of flexible sheet material having a weakened line extending therealong between its opposite side edges and overlapping and being secured to said overlapped marginal portions of both of said adjoining sheets to further stiffen said portion of said stiffer sheet, said reinforcing strip having a tear strip on one side of said weakened line and consisting only of that portion of the reinforcing strip which overlaps said more flexible sheet and having an end thereof accessible from the exterior of the wrapper to facilitate removal of the tear strip and a portion of said adjoining more flexible sheet outwardly away from the adjacent end of the stiffer sheet and from said reinforcing strip for gaining access to the loaf by separating the wrapper into two complementary flexible cup-shaped sections, the edge of said stiffened section being further stiffened by the reinforcing strip so as to facilitate the telescopic reclosing and sealing of the package.

SHY ROSEN.

REFERENCES CITED

The following references are of record in the file of this patent:

UNITED STATES PATENTS

| Number | Name | Date |
|---|---|---|
| 1,180,541 | Roden | Apr. 25, 1916 |
| 1,827,636 | Ames | Oct. 13, 1931 |
| 2,048,895 | Rosen | July 28, 1936 |
| 2,106,748 | Karnes et al. | Feb. 1, 1938 |
| 2,143,844 | Daller | Jan. 17, 1939 |
| 2,286,307 | Replogle | June 16, 1942 |

FOREIGN PATENTS

| Number | Country | Date |
|---|---|---|
| 350,111 | Great Britain | June 11, 1931 |